Patented May 11, 1926.

1,584,048

UNITED STATES PATENT OFFICE.

ALEXANDER THOMAS STUART AND GUY NOVERRE MIDDLETON, OF TORONTO, ONTARIO, CANADA, ASSIGNORS, BY MESNE ASSIGNMENTS, TO FARLEY G. CLARK.

APPARATUS FOR THE DECOMPOSITION AND RECOMBINATION OF HYDROCARBONS.

Application filed July 5, 1917, Serial No. 176,703. Renewed August 10, 1925.

This invention relates to an apparatus:—

(a) By which desired chemical reactions may be carried out under most favourable conditions during the treatment of the original hydrocarbon matter to form hydrocarbon fractions and new hydrocarbon compounds; and (b) By which may be prevented the excessive decomposition of the hydrocarbons resulting from the tendency of the decomposition to enrich certain of the hydrocarbon compounds with hydrogen liberated during the decomposition of the hydrocarbon matter under treatment, caused by such liberated hydrogen reacting to an excessive extent with certain of the hydrocarbons and correspondingly depriving others of more-or-less of their hydrogen content, and resulting in some of the hydrocarbon matter being reduced to a cokey or carbonaceous mass deposited in the reaction zone, and depriving others of their hydrogen content to a less degree, but still to an extent that the resulting compounds are of poor value, and so enriching others that they largely become fixed gases caused by the condition of equilibrium established in the reaction zone, limiting the action of the liberated hydrogen with the decomposed hydrocarbons.

The invention relates to apparatus for adding a non-oxidizing reagent preferably hydrogen under pressure, to the hydrocarbon matter being treated, and controllably adjusting the amount of such reagent to the requirements of the reaction, so that the equilibrium established by the hydrogen liberated during the decomposition of the hydrocarbon matter will be disturbed in a degree favorable to the recovery of valuable products, thereby preventing undue liberation of the hydrogen and carbon from, and the excessive decomposition of, the hydrocarbon matter under treatment, and forming smaller quantities of fixed gases, the added hydrogen regulating the character and amounts of the altered hydrocarbons thereby produced.

In a preferred method of carrying out the process the hydrogen and the hydrocarbon matter to be treated are injected into a closed tube constituting the reaction chamber, which is heated, preferably electrically, to any desired temperature and is capable of withstanding considerable pressure while hot.

The injection takes place under pressure, not exceeding one hundred and twenty pounds, to maintain the desired concentration ratio between the hydrocarbon vapor and the hydrogen, and the heat input is such that the hydrocarbon matter entering the reaction chamber is heated, and then vaporized in traversing the heated zone, the vapor thus formed absorbing heat from the walls of the reaction chamber, until decomposition occurs.

The amount of hydrogen for the reaction is so proportioned that it is from two to four per cent by weight of the hydrocarbon matter treated, and during the reaction combines with the decomposed hydrocarbn constituents to produce the desired product.

In carrying out this process, five principal factors or variables govern the effect:—time, temperature, pressure, catalyzers, and concentrations. All of these factors exercise more or less influence upon the course of the reaction, but the degree of concentration of the various compounds in the reaction exercises the greatest influence, and it is by a more exact control of this variable, the concentration, that the reaction may be altered to suit any particularly desired result. To effect this, hydrogen may be controllably fed into the apparatus continuously or otherwise, and in various proportions, along with the hydrocarbon matter to be treated, the desired altered fractions being allowed to pass through a zone of any suitably-reduced temperature, and the undesired fractions being condensed therein and returned to the reaction zone for their further treatment.

For instance, for the production of lubricating oil, paraffin, kerosene, gasoline, benzene, toluene, and fixed gases of high illuminating value, or any one or more of them, or any one or more of the other hydrocarbon products, a suitable hydrocarbon may be passed through a reaction zone at a pressure of about 120 lbs. per square inch, at a temperature up to 600 degrees centigrade, at an appropriate velocity, together with about four per cent of a non-oxidizing reagent, preferably hydrogen, added at the same temperature and pressure, the products, after passing from the reaction zone, and while still under pressure, being refrigerated, thereby effecting the complete condensation and recovery of the more-or-less volatile constituents.

By the employment of a non-oxidizing reagent, such as hydrogen, the formation of so-called iron oxide enamel in the reaction zone is prevented, and the decomposition and recombination of the hydrocarbons under treatment may be carried on with greater efficiency than when the formation of iron oxide enamel occurs, and by preventing deposition of carbonaceous matter and excessive decomposition of the hydrocarbons under treatment, larger yields of cracked oils and gases are obtained, the cracking of the hydrocarbons being carried on with less tendency to form unsaturated compounds, a greater percentage of the original matter being broken up into desirable products, the amount of poor value products such as carbons and heavy hydrocarbons being very much less than by processes not using added hydrogen, and the general mechanical difficulties heretofore involved in the removal of solid depositions in the reaction zone being obviated.

A catalyst, or other substance foreign to the ultimate recombination, may be used in the reaction zone, for benefiting and accelerating the process, aluminum chloride, activated nickel, carbon, vanadium, heated metallic surfaces, various refractories, and the like, being suitable for that purpose.

The apparatus by which the process is carried out, is designed so as to be capable of heat conservation, close temperature regulation, high thermal input per unit surface area, mechanical resistance to high pressures, the selective recovery of the desired products and the automatic retreatment of the undesired products; and this apparatus consists essentially of a closed reaction chamber, whose wall or walls is or are electrically resistant, and into which matter, to be acted on, is admitted, combined with a suitably-trapped condenser, or a battery of suitably-trapped condensers, connected in series through which the hydrocarbon fractions may pass from the reaction zone.

In the preferred type of apparatus, the reaction chamber is preferably surrounded by a protecting jacket, with appropriate insulation interposed between the jacket and the reaction chamber to prevent heat being radiated from the reaction chamber to the jacket.

The reaction chamber may take a tubular form, and may be constructed of standard or special tubing adaptable to ordinary electrical circuits or transformers, the shape and dimensions of the reaction chamber being determined by the normal daily capacity of the apparatus.

In the drawings:—

Fig. 3, is a detail view of the reaction chamber; and,

Fig. 4, is a similar view of a modification of the reaction chamber.

The reaction chamber $a$, which may preferably take a tubular form, and be of any suitable dimensions and cross-sectional shape, is surrounded by a corresponding jacket $b$, capable in itself of withstanding high pressures. This jacket is provided with an inlet $e$, through which a pressure-balancing medium may be admitted, to occupy the space between the jacket and the reaction chamber. Contained between the jacket and the reaction chamber, is a heat insulator $c$, to prevent the radiation of heat from the reaction chamber to the jacket. The presence of this insulator is advisable, as the jacket should be kept at as low a temperature as possible, to enable it to retain its full tensile strength.

Connected with the reaction chamber at its opposite extremities, are intake and offtake pipes $f$ and $g$, respectively, and connected with the intake and offtake pipes are the electrical conductors $f'$ and $g'$ of the heating circuit, the flow of which is so regulated as to heat the reaction chamber to the desired temperature, this heat being conserved within the reaction chamber by the presence of the heat insulator $c$.

The reaction chamber is provided with a contact making and breaking pyrometer $h'$ which opens and closes an electric circuit $k$, $j'$, $k'$, $j''$, controlling a contact or circuit breaking device $j^3$, by which the heating circuit formed by the conductors $f'$ and $g'$ may be made and broken.

The difference in the ratio of expansion between the reaction chamber and the jacket may be utilized to operate a mechanical contact $i'$, $i''$ for making and breaking an electric circuit $j'$, $j''$, controlling the contact or circuit breaking device $j^3$, by which the same heating circuit may be made and broken, such an expansion arrangement constituting in itself a thermostatic control.

Coacting with the reaction chamber is a condenser or set of condensers connected in series.

Figure 1:
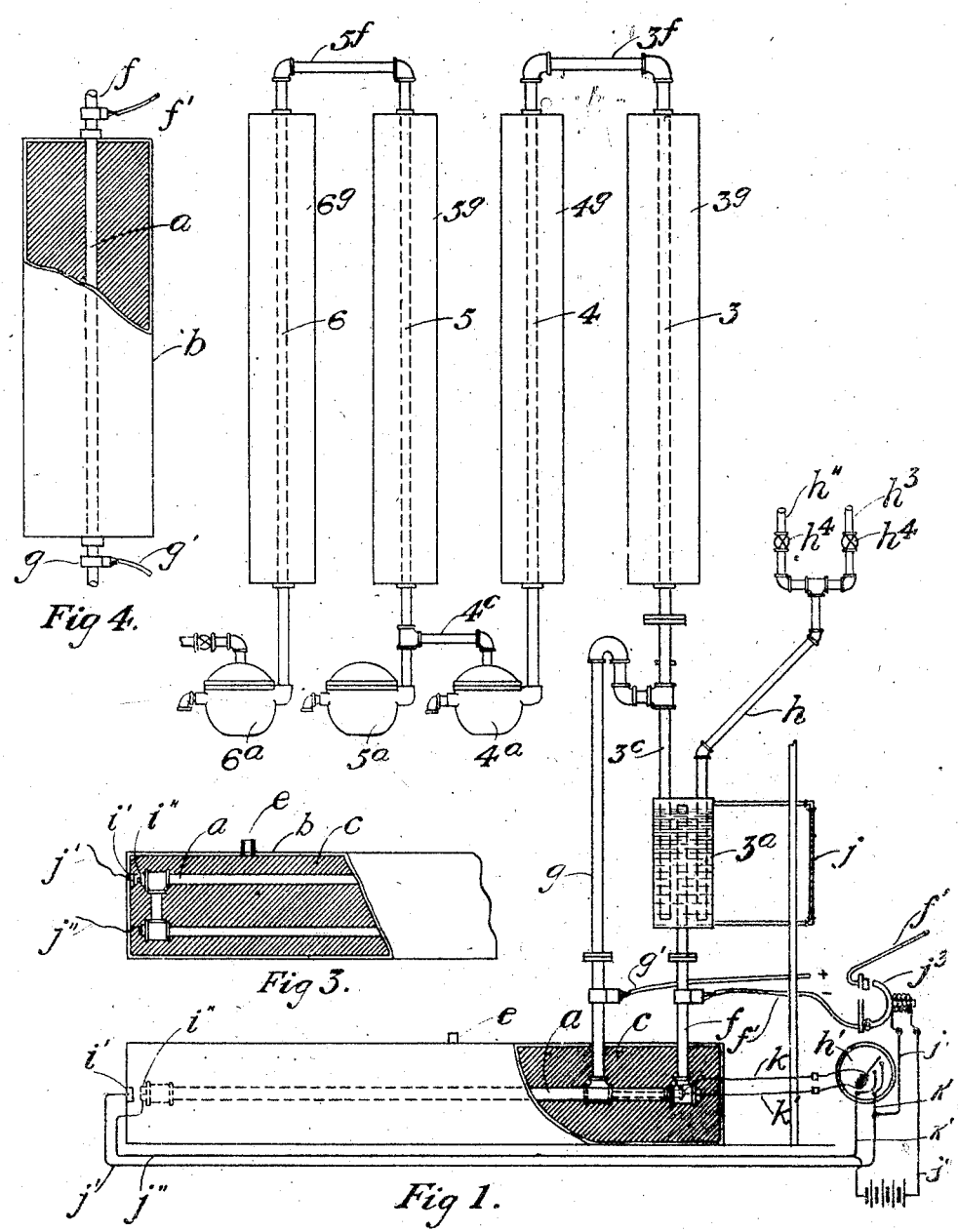
Fig. 1, represents a longitudinal sectional elevation of a preferred form of apparatus.
Figure 2:
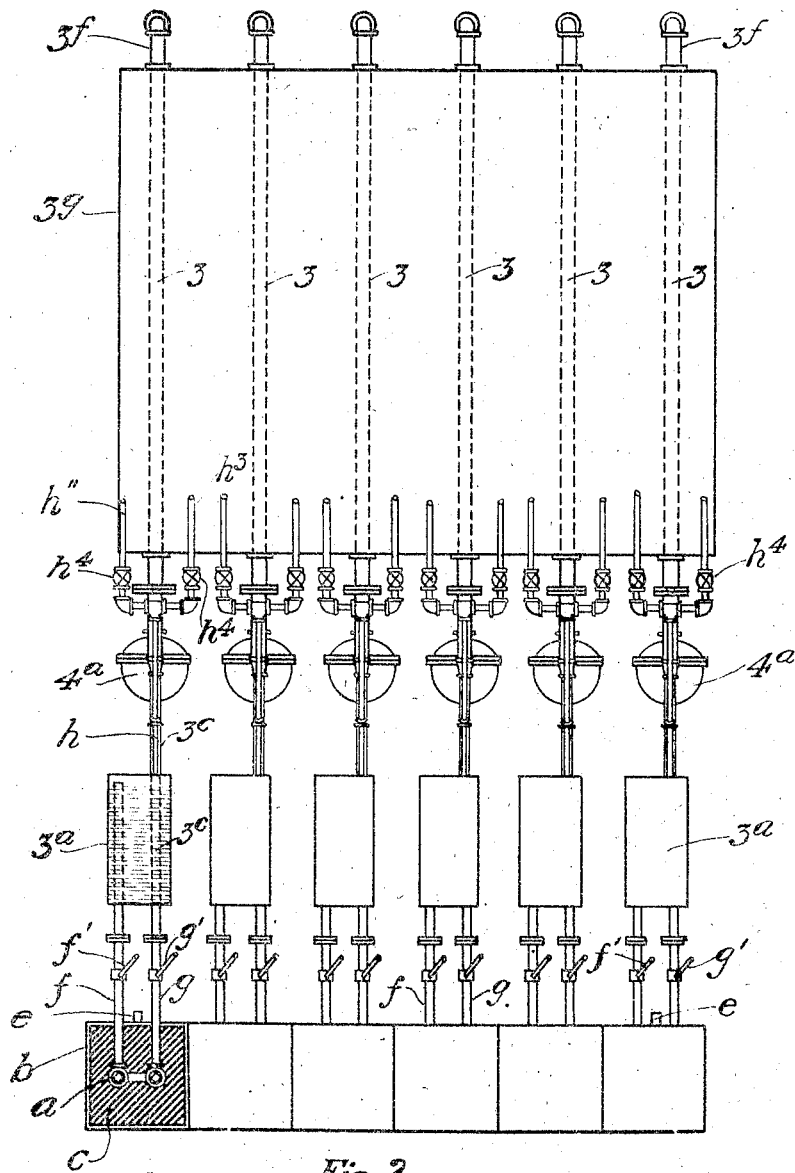
Fig. 2, is a similar view taken at right angles to Fig. 1.

In Fig. 1 of the drawings, each reaction chamber is shown to be connected through a set of four condensers, numbered 3 to 6 inclusive, and in Fig. 2, is shown a battery of six reaction apparatus, the condensers of each set being connected in series, with their respective reaction chamber.

In Fig. 1, each condenser 3, 4, 5 and 6 is shown to be provided with a trap $3^a$, $4^a$, $5^a$, and $6^a$ respectively, each of the condensers being preferably of a tubular formation of any suitable cross-sectional shape and dimensions.

At the bottom of the condenser 3 is a drainage pipe $3^c$ extending down to approximately the bottom of the trap $3^a$, and the top of this condenser is connected by a coupling pipe $3^f$, with the top of the condenser 4. The lower end of the condenser 4 extends down into the trap $4^a$, the top of which is connected by a pipe $4^c$ with the condenser 5 above its trap $5^a$, the top of the condenser 5 being connected by a coupling pipe $5^f$, with the top of the condenser 6, the lower end of which leads down into the trap $6^a$. The offtake pipe $g$ is connected with the condenser 3 above the level of the trap $3^a$, and the intake pipe $f$ extends into the trap $3^a$ near the top thereof. Leading into the trap $3^a$, near the bottom thereof, is the feed pipe $h$, by which the matter to be treated in the reaction chamber is delivered into the trap to pass through the intake pipe $f$ to the reaction zone, the trap $3^a$ being provided with a gauge glass $j$, and connected with the feed pipe $h$ are the hydrocarbon and hydrogen pipes $h''$, $h^3$, respectively, each provided with an appropriate controller $h^4$ by which the amount of the hydrogen may be controllably adjusted to the requirements of the reaction.

When fluid matter, such as hydrocarbons, is to be treated in the reaction chamber, it is delivered through the feed pipe $h$ into the trap $3^a$, filling the trap until it attains the level of the top of the intake pipe $f$, through which it then flows into the reaction chamber $a$.

The reaction chamber shown in Fig. 3, is of a U-bend type, and its wall or walls is or are electrically resistant, but the reaction chamber may be of any other type, such as that shown in Fig. 4.

The conductors $f'$, $g'$ of the heating circuit are connected with the intake pipe $f$ and offtake pipe $g$, respectively, and the current circuiting from the conductor $f'$ to the conductor $g'$, by means of the reaction chamber, heats its wall to any desired temperature.

The matter to be treated, when it enters the reaction zone, undergoes decomposition, and passes through the offtake pipe $g$ in the form of gases to the condenser 3.

The heavier hydrocarbon products, whose boiling point ranges are necessarily higher than those of the lighter hydrocarbon products, condense at higher temperatures than such lighter hydrocarbons, and, should it be necessary to retreat any of the heavier hydrocarbon products, the condensing temperature of the condenser 3 may be set to take off such heavier products in the form of condensates, and run them back through the trap $3^a$, in which they will mingle with the matter to be treated as they pass into the reaction zone.

The hydrocarbon fraction with the next higher boiling point may be taken off as condensate through the trap $4^a$, and so on through the traps $5^a$ and $6^a$.

To control the character of the hydrocarbons taken off through these different traps, each condenser 3, 4, 5 and 6 is provided with a jacket $3^g$, $4^g$, $5^g$ and $6^g$ respectively, to contain the condensing agent, the temperature of which is different for each condenser, so that the different condensates may be simultaneously taken off from the condensers, and in this way, the necessity for fractional distillation may be avoided.

As shown in Fig. 1, the jacket $b$ is provided with a mechanical contact $i'$, and the reaction chamber is provided with a mechanical contact $i''$. Connected with the contacts $i'$ and $i''$ are electrical conductors $j'$, $j''$, controlling a circuit breaker $j^3$ for the main heating circuit $f'$, $g'$, so that in the event of the temperature in the reaction chamber rising above the degree for which the mechanical contacts $i'$, $i''$ are set, these contacts will come together and close the circuit through the circuit breaker $j^3$ to open the main heating circuit $f'$, $g'$. The contact making and breaking pyrometer $h'$, connected with the conductors $j'$, $j''$, by means of a controlled circuit $k$, $k'$, will also actuate the circuit breaker to open the main heating circuit.

In the decomposition of hydrocarbons, it is necessary to maintain high pressures in the reaction zone, such pressures approximating eight to ten atmospheres, and sometimes higher, and in such cases, it is necessary to counterbalance the pressure within the reaction zone by a corresponding pressure on the outside of it, as otherwise, the reaction chamber would be liable to rupture, as a result of such internal pressure, owing to its reduced tensile strength, resulting from its high temperature.

The counterbalancing pressure within the jacket may be obtained either by passing some of the matter to be treated into the chamber formed by the jacket and the reaction zone, if the conditions of the process and the apparatus warrant it, or, when this is not possible, a counterbalancing pressure may be obtained by forcing a gaseous agent into the space between the reaction chamber and the jacket, through the inlet $e$, the presence of such counterbalancing pressure lowering the tendency to rupture to a negligible quantity.

Toluene, benzene, gasolene, kerosene and lubricating oil, with residual fixed gases of high thermal and illuminating value, may be obtained from hydrocarbon matter such as so called crude oil, or gas oil according to the following treatment:

For example gas oil and hydrogen are fed into the reaction chamber through the feed pipe, at a pressure up to one hundred and twenty pounds per square inch, and at a rate of flow of about two gallons of gas oil and one half pound of hydrogen, per hour.

The reaction chamber in this case is a tube 10′ in length, with an internal diameter of about 1¼″, heated by the passage of a heavy electric current through its wall, circuiting by means of the conductors.

The catalytic effect of the reaction is derived from the action of the white-hot clean iron surface on the hydrocarbon vapor.

The time required for one gallon of oil and the hydrogen necessary for the reaction to pass completely through a reaction zone of this size is approximately one-half hour.

The oil boils and vaporizes in the reaction zone in about the first quarter of its length. The vapor is superheated, by absorption of the heat from the walls of the reaction zone, during its passage through the remaining three-quarters of its length, until decomposition of the hydrocarbon matter treated occurs. The constituents of this matter then combine with the added hydrogen. The time of treatment, the temperature and pressure at which the reaction is carried out, and the nature of the interior surface of the reaction zone, whether smooth or rough, have considerable influence on the class of product obtained.

High pressures produce a high percentage of liquids, and high temperatures produce a high percentage of gases, while too high velocities, or too smooth and uninterrupted flow through the reaction zone, permit more or less oil to pass through unaltered.

The quantity of hydrogen required in the reaction, is usually from two to four per cent of the hydrocarbon matter treated for the most favorable results, the percentage added being dependent upon the exact degree of dissociation existing between the hydrogen and carbon constituents of the hydrocarbon matter in the reaction, and the amount of fixed gases as a result of the process.

The percentage of hydrogen required to prevent the deposition of carbon, determines the minimum amount that may be used. The desired quantity and thermal content of the fixed gases per cubic foot, and their volume, determine the maximum percentage of hydrogen that may be used. Too large a percentage is detrimental to the complete condensation of the vapors, as with large gas yields, it becomes difficult to prevent a certain amount of re-evaporation of the condensed liquids in the condensers, and the smaller the percentage of hydrogen added, within practicable limits, the lower will be the loss by re-evaporation.

After passing through the reaction tube, the vapor and gas enter the bottom of the first condenser, 3, where the fraction with the highest boiling point condenses and passes into the trap $3^a$. The residual uncondensed vapor and gas pass to the condensers 4, 5 and 6, successively, at the same pressure as that at which they are at in the reaction zone, where successive fractions having consecutively lower boiling points are condensed and collected in their respective traps $4^a$, $5^a$ and $6^a$.

In the present example the condenser 3 should be kept at a temperature of about 400 degrees centigrade, the condenser 4 at about 250 degrees centigrade, the condenser 5 at about 100 degrees centigrade, and the condenser 6 at about —20 degrees centigrade.

The electrical energy required as heat in the reaction zone is from 2.7 to 3.2 K. W. H. per gallon of hydrocarbon matter treated.

The percentage of recovery of total liquid hydrocarbon treated is 40%, composed as follows: Heavy hydrocarbon caught in the condenser 3 and returned, 20%; light hydrocarbon to be refined 20%.

Résumé of process.

Oil feed—(all calculations on basis of 1 gal.). Temperature (max. tube), 600° C.; pressure (lbs.), 120; time (minutes per gal.), 30; k. w. h. (per gal.), 2.7; hydrogen feed, 4%=½ lb.=cu. ft., 90; recovered oil (% of original), 40; oil gasified (% of original), 60; gas from oil (cu. ft.), 50; heavy oil to be retreated (% of original), 20; light oil to be refined (% of original), 20.

Having thus fully described the nature of our invention, what we claim as new and desire to secure by Letters Patent, is:—

Apparatus for heat treatment of hydrocarbons comprising a cracking retort of heavy walled metal pipe encased in heat insulation and having sufficiently low electrical conductivity to act as a resistor, means for passing current through said pipe to heat the retort to a relatively high temperature, said retort being provided with a feed intake and a vapor offtake, adjustable means for feeding to said intake a mixture of a hydrocarbon and a gas, condenser means connected to said offtake, and a return trap device connecting said condenser means with said intake.

Toronto, June 14th, 1917.
ALEXANDER THOMAS STUART.
GUY NOVERRE MIDDLETON.